United States Patent
Corley et al.

(10) Patent No.: US 8,194,641 B2
(45) Date of Patent: Jun. 5, 2012

(54) METHOD AND SYSTEM FOR OPERATING A COMMUNICATION SERVICE PORTAL

(75) Inventors: Robert David Corley, Plano, TX (US); Richard B. Platt, Prosper, TX (US); Louis G. Fausak, Coppell, TX (US); Andrew K. Fullford, Dallas, TX (US)

(73) Assignee: Cisco Technology, Inc., San Jose, CA (US)

( * ) Notice: Subject to any disclaimer, the term of this patent is extended or adjusted under 35 U.S.C. 154(b) by 1077 days.

(21) Appl. No.: 11/092,786

(22) Filed: Mar. 28, 2005

(65) Prior Publication Data

US 2006/0215636 A1 Sep. 28, 2006

(51) Int. Cl.
*H04L 12/66* (2006.01)
*H04L 12/28* (2006.01)
*H04L 12/56* (2006.01)

(52) U.S. Cl. ........................................ 370/352; 370/401

(58) Field of Classification Search .................. 370/352, 370/401, 389; 379/201.12; 705/7, 26
See application file for complete search history.

(56) References Cited

U.S. PATENT DOCUMENTS

| | | | | |
|---|---|---|---|---|
| 4,852,154 A | | 7/1989 | Lewis et al. | 379/105 |
| 5,862,490 A | * | 1/1999 | Sasuta et al. | 455/525 |
| 5,873,030 A | | 2/1999 | Mechling et al. | 455/408 |
| 6,012,088 A | | 1/2000 | Li et al. | 709/219 |
| 6,061,436 A | | 5/2000 | Bauer et al. | 379/114 |
| 6,226,273 B1 | | 5/2001 | Busuioc et al. | 370/270 |
| 6,324,185 B1 | | 11/2001 | Budhraja | 370/468 |
| 6,425,013 B1 | | 7/2002 | Schmidt et al. | 709/230 |
| 6,459,683 B2 | | 10/2002 | Busuioc et al. | 370/270 |
| 6,546,094 B1 | | 4/2003 | Turner et al. | 379/201.12 |
| 6,546,095 B1 | | 4/2003 | Iverson et al. | 379/201.12 |
| 6,606,744 B1 | | 8/2003 | Mikurak | 717/174 |
| 6,647,112 B2 | * | 11/2003 | Smith | 379/220.01 |
| 6,715,075 B1 | | 3/2004 | Loukianov | 713/176 |
| 6,721,716 B1 | * | 4/2004 | Gross | 705/40 |
| 6,735,293 B2 | | 5/2004 | Doherty et al. | 379/201.12 |
| 6,768,731 B1 | | 7/2004 | Huh | 370/352 |
| 6,789,193 B1 | | 9/2004 | Heiden | 713/175 |
| 6,847,704 B1 | | 1/2005 | Cherchali et al. | 379/93.05 |
| 6,853,621 B1 | | 2/2005 | Spear et al. | 370/238 |
| 6,879,584 B2 | | 4/2005 | Thro et al. | 370/352 |
| 6,898,435 B2 | * | 5/2005 | Milman | 455/457 |
| 6,990,525 B1 | * | 1/2006 | Ying et al. | 709/227 |

(Continued)

OTHER PUBLICATIONS

U.S. Appl. No. 11/092,798, entitled "Method and System for Installing Premise Equipment," filed Mar. 28, 2005, 46 pages.

(Continued)

*Primary Examiner* — Chi Pham
*Assistant Examiner* — Farah Faroul
(74) *Attorney, Agent, or Firm* — Baker Botts L.L.P.

(57) ABSTRACT

A method of providing communication service includes receiving user identification information and first communication service criteria. The user identification information identifies a user, while the first communication service criteria describe a first communication service requested by the user. The method also includes generating a first communication service order based on the first communication service criteria. The first communication service order includes the user identification information and the communication service criteria. The method further includes selecting premise equipment for the user and generating an equipment order. The equipment order includes the user identification information and identifies the selected premise equipment. Additionally, the method includes transmitting the first communication service order to a first service provider and transmitting the equipment order to an equipment provider.

37 Claims, 5 Drawing Sheets

U.S. PATENT DOCUMENTS

| | | | | |
|---|---|---|---|---|
| 7,073,055 B1* | 7/2006 | Freed et al. | | 713/155 |
| 7,114,070 B1 | 9/2006 | Willming et al. | | 713/156 |
| 7,194,004 B1 | 3/2007 | Thomsen | | 370/401 |
| 7,225,220 B2* | 5/2007 | Gonzalez et al. | | 709/202 |
| 7,272,588 B2* | 9/2007 | Marr | | 707/1 |
| 7,281,046 B1* | 10/2007 | Sunderasan et al. | | 709/228 |
| 7,562,142 B2 | 7/2009 | Nakamura | | 709/225 |
| 7,593,349 B2 | 9/2009 | Scheering | | 370/254 |
| 7,707,405 B1 | 4/2010 | Gilman et al. | | 713/156 |
| 7,734,289 B2* | 6/2010 | Shaw et al. | | 455/432.1 |
| 2002/0101858 A1 | 8/2002 | Stuart et al. | | 370/352 |
| 2002/0103760 A1 | 8/2002 | Tianen et al. | | 705/52 |
| 2002/0126701 A1 | 9/2002 | Requena | | 370/469 |
| 2002/0150230 A1* | 10/2002 | Fang | | 379/265.09 |
| 2002/0181685 A1 | 12/2002 | Doherty et al. | | 379/201.12 |
| 2002/0194583 A1 | 12/2002 | Kitagawa | | 717/173 |
| 2003/0028808 A1 | 2/2003 | Kameda | | 713/201 |
| 2003/0076841 A1 | 4/2003 | Boxall et al. | | 370/401 |
| 2004/0064351 A1 | 4/2004 | Mikurak | | 705/7 |
| 2004/0100990 A1 | 5/2004 | Chen et al. | | 370/468 |
| 2005/0190743 A1* | 9/2005 | Marcu et al. | | 370/352 |
| 2005/0213567 A1* | 9/2005 | Mullins et al. | | 370/352 |
| 2006/0026011 A1 | 2/2006 | Verego et al. | | 705/1 |
| 2006/0126613 A1* | 6/2006 | Zweig | | 370/389 |
| 2006/0129325 A1* | 6/2006 | Gao et al. | | 702/19 |
| 2006/0265483 A1* | 11/2006 | Wang et al. | | 709/223 |

OTHER PUBLICATIONS

PCT Notification of Transmittal of the International Search Report and the Written Opinion of the International Searching Authority, or the Declaration with attached PCT International Search Report and PCT Written Opinion of the International Searching Authority in International Application No. PCT/US06/08805, dated Sep. 27, 2006, 15 pages.

*USPTO Office Action* for U.S. Appl. No. 11/178,711, filed Jul. 11, 2005 in the name of Robert David Corley, et al.; 22 pages, Jan. 28, 2009.

*USPTO Office Action* for U.S. Appl. No. 11/092,798, filed Mar. 28, 2005 in the name of Robert David Corley, et al.; 28 pages.

*USPTO Office Action* for U.S. Appl. No. 11/178,711, filed Jul. 11, 2005 in the name of Robert David Corley, et al.; 18 pages.

*USPTO Office Action* for U.S. Appl. No. 11/092,798, filed Mar. 28, 2005 in the name of Robert David Corley, et al.; 17 pages.

*USPTO Advisory Action* for Application No. 11/092,798, filed Mar. 28, 2005 in the name of Robert David Corley, et al.; 3 pages.

Manoj Wagle, et al.; Internet Engineering Task Force; *An Out-of-Band Authentication Procedure for SIP*; 16 pages, Nov. 10, 2002.

*USPTO; Office Action* for U.S. Appl. No. 11/178,711, filed Jul. 11, 2005 in the name of Robert David Corley; 17 pages.

*USPTO; Office Action* for U.S. Appl. No. 11/092,798, filed Mar. 28, 2005 in the name of Robert David Corley; 18 pages.

*USPTO; Office Action* for U.S. Appl. No. 11/178,711, filed Jul. 11, 2005 in the name of Robert David Corley; 18 pages.

State Intellectual Property Office of the People's Republic of China, The First Office Action (PCT application in Chinese national phase), Filing No. 200680004173.4, 11 pages, Apr. 8, 2010.

*USPTO; Notice of Allowance and Fee(s) Due* for U.S. Appl. No. 11/092,798 in the name of Robert David Corley; 19 pages, Mar. 9, 2010.

*USPTO; Office Action* for U.S. Appl. No. 11/178,711 in the name of Robert David Corley; 17 pages, Jul. 2, 2010.

*USPTO; Office Action* for U.S. Appl. No. 11/092,798 in the name of Robert David Corley; 17 pages, Sep. 9, 2010.

*European Patent Office; European Search Report* for Application No. 06737935.4-2414; 9 pages, May 11, 2011.

*USPTO; Notice of Allowance and Fee(s) Due* for U.S. Appl. No. 11/178,711 in the name of Robert David Corley; 7 pages, Feb. 4, 2011.

*USPTO; Office Action* for U.S. Appl. No. 11/092,798 in the name of Robert David Corley; 17 pages, Feb. 23, 2011.

*USPTO; Notice of Allowance and Fee(s) Due* for U.S. Appl. No. 11/178,711 in the name of Robert David Corley; 7 pages, Jun. 27, 2011.

*USPTO; Office Action* for U.S. Appl. No. 11/092,798 in the name of Robert David Corley; 17 pages, Jun. 29, 2011.

The Patent Office of the People's Republic of China, *The Second Office Action* for Application No. 200680004173.4, 10 pages, Oct. 21, 2011.

\* cited by examiner

METHOD AND SYSTEM FOR OPERATING A COMMUNICATION SERVICE PORTAL

TECHNICAL FIELD OF THE INVENTION

This invention relates, in general, to communication systems and, more particularly, to a system for consolidating setup, operation, and billing for a plurality of communication services.

BACKGROUND OF THE INVENTION

Technological advancements of recent years have made sophisticated and diverse telecommunication systems, including voice over IP (VoIP) telephones and high-speed internet connections, practical options for filling the voice and data communication needs of small-businesses and independent professionals, such as doctors and attorneys. As prices continue to fall on communication systems and the complexity of such systems continues to increase, customer knowledge and understanding of the underlying components and services is becoming an increasingly significant barrier to new customers entering the telecommunications market. Additionally, because advanced telecommunication systems can include a diverse collection of components utilizing communication services from a number of different service providers, initiation of service can be an extremely time-consuming process for the end user. Moreover, the number of different components and service providers that must be integrated for an advanced telecommunication system can create significant problems with compatibility.

SUMMARY OF THE INVENTION

In accordance with the present invention, the disadvantages and problems associated with communication systems have been substantially reduced or eliminated. In particular, a system and method are provided for initiating communication service, billing a user for these services, and/or automatically configuring services locally and/or across a diverse network.

In accordance with one embodiment of the present invention, a method of providing communication service includes receiving user identification information and first communication service criteria. The user identification information identifies a user, while the first communication service criteria describe a packet-based communication service requested by the user. The method also includes generating a first communication service order based on the first communication service criteria. The first communication service order includes the user identification information and the communication service criteria.

The method further includes selecting premise equipment for the user and generating an equipment order, wherein the equipment order includes the user identification information and identifies the selected premise equipment. The premise equipment is capable of supporting packet-based communication at a premise associated with the user. Additionally, the method includes transmitting the first communication service order to a first service provider and transmitting the equipment order to an equipment provider.

In accordance with another embodiment of the present invention, a system for providing communication services includes a fulfillment interface, first communication access equipment, an equipment provider interface, and a service node. The fulfillment interface is operable to receive information from a user and to generate a service request that includes user identification information and first communication service criteria. The user identification information identifies the user and the first communication service criteria describe a packet-based communication service requested by the user. The first communication access equipment is operated by a communication service provider and is operable to support communication for premise equipment over a first network and to establish service for a user in response to a service order received by the communication service provider. Additionally, the equipment provider interface is capable of receiving an equipment order and to facilitate the delivery of premise equipment identified by the equipment order to the user. The premise equipment is capable of supporting packet-based communication at a premise associated with the user.

Furthermore, the service node is capable of receiving the service request from the fulfillment interface and generating a first communication service order based on the first communication service criteria. This first communication service order may include the user identification information and the communication service criteria. The user identification information is also capable of selecting premise equipment for the user and generate an equipment order that includes the user identification information and identifies the selected premise equipment. The service node is further capable of transmitting the first communication service order to the first service provider and transmitting the equipment order to the equipment provider through the equipment provider interface.

Important technical advantages of certain embodiments of the present invention include a simplified and streamlined process for users to initiate communication services. Other important technical advantages of certain embodiments of the present invention include simplifying the process for installing communication equipment, consolidating bills for some or all communication services utilized by users, reducing compatibility problems within the communication system, and providing automatic configuration of premise communication equipment even across diverse networks. Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
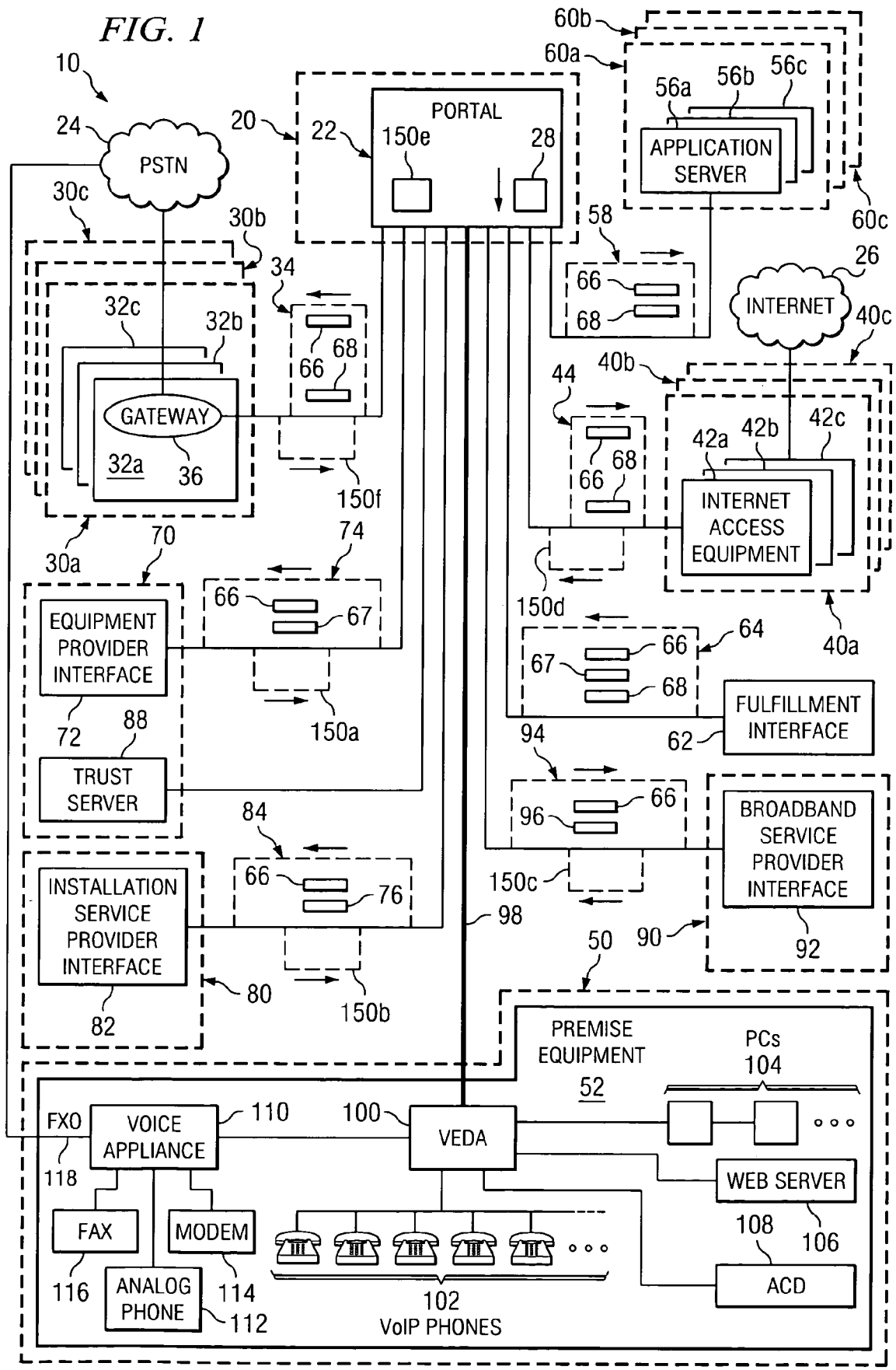
FIG. 1 illustrates components of a communication system according to a particular embodiment.

FIG. 1 illustrates a particular embodiment of a communication system 10 that provides voice and/or data communication services to user 50 on one or more networks. As shown, communication system 10 includes a public-switched telephone network (PSTN) 24, an Internet 26, a broadband connection 98, premise equipment 52, a fulfillment interface 62, an installation service provider interface 82, an equipment provider interface 72, a broadband service provider interface 92, and a trust server 88. Communication system 10 also includes a service node 22 that initiates communication service for user 50 with telephone service providers (TSPs) 30, internet service providers (ISPs) 40, and/or application service providers (ASPs), obtains premise equipment 52 for user 50, supports communication service for user 50 over Internet 26 and/or PSTN 24 using premise equipment 52, and bills user 50 for utilized communication services. As a result, service node 22 may, in particular embodiments of communication system 10, provide a streamlined, integrated process for user to obtain and utilize communication services provided by various elements of communication system 10.

Additionally, FIG. 1 illustrates various entities, including a user 50, a hosted solution provider (HSP) 20, a plurality of ISPs 40, a plurality of TSPs 30, a plurality of application service providers (ASPs) 60, an equipment provider 70, an installation service provider 80, and a broadband service provider 90 that operate, possess, or control particular elements of communication system 10 or perform a particular task according to an example configuration of communication system 10. Each entity is shown in FIG. 1 as dotted line boxes enclosing elements of communication system 10 controlled by that entity. Although FIG. 1 illustrates an example configuration of communication system 10 in which particular entities operate particular elements of communication system 10, operation of the various elements of communication system 10 may be distributed among these entities in any suitable manner. Moreover, any two or more of user 50, HSP 20, ISPs 40, TSPs 30, ASPs 60, installation service provider 80, equipment provider 70, and broadband service provider 90 may represent the same entity in a particular embodiment of communication system 10.

According to the illustrated configuration, user 50 operates premise equipment 52 and utilizes premise equipment 52 to receive communication services provided by communication system 10. In a particular embodiment, user 50 may represent a commercial or professional entity, such as a small business or a doctor's office, requiring support for multiple communication devices, shown as premise equipment 52. In general, user 50 may however represent any appropriate entity or individual utilizing communication service of any type. Although FIG. 1 shows, for the sake of simplicity, only a single user 50, particular embodiments of service node 22 may be configured to support communication services for any appropriate number of users 50.

HSP 20 operates service node 22 and may, through service node 22 or independently of service node 22, market communication services to users 50, receive requests for communication services, order premise equipment 52, initiate services for users 50, schedule installation services, provide additional professional services, bill user 50 for all services and products associated with communication system 10 that are received or utilized by user 50, and/or perform any other appropriate task associated with initiating and maintaining communication services for user 50 on communication system 10. In a particular embodiment, HSP 20 may purchase or lease service node 22 from an equipment manufacturer or retailer and contract service providers and/or broadband service provider 90 to provide communication services to users 50 enlisted by HSP 20. As a result, HSP 20 may be responsible for providing a variety of communication services to users 50 without directly owning or operating any form of connection to PSTN 24 or Internet 26.

ISPs 40 each operate an instance of Internet access equipment 42 providing user 50 access to Internet 26, and TSPs 30 each operate an instance of PSTN access equipment 32 providing user 50 access to PSTN 24. ISPs 40 and TSPs 30 may each represent a local exchange carrier (LEC) that owns a portion of PSTN, an entity renting telephones lines or other connectivity elements from an LEC, or any other suitable entity capable of offering user 50 connection to PSTN 24 or Internet 26.

ASPs 60 each operate an application server 56 providing user 50 various communication, professional, and/or other services in addition to those provided by HSP 20, TSPs 30, and ISPs 40. ASPs 60 may represent any appropriate parties that provide services to user 50 related to premise equipment 52. For the purposes of this description, TSPs 30, ISPs 40, and ASPs 50 may be referred to collectively as "service providers."

Broadband service provider 90 provides a broadband connection 98 between premise equipment 52 and service node 22 based on a broadband service order 94 received at broadband service provider interface 92. Broadband connection 98 may represent any appropriate connection capable of supporting broadband communication between premise equipment 52 and service node 22 including, but not limited to landline, cable, and satellite broadband connections. Moreover, in a particular embodiment, broadband service provider 90 represents the same entity as one of TSPs 30, and broadband service provider 90 provides broadband connection 98 over a portion of PSTN 24.

Equipment provider 70 provides premise equipment to user 50 based on an equipment order 74 received by equipment provider 70 at equipment provider interface 72. Equipment provider 70 may represent a retailer of communication equipment, a manufacturer of such equipment, or any other party who may sell and/or deliver premise equipment to end users. Equipment provider 70 may sell, lease, or provide premise equipment 52 to user 50 based on any other suitable arrangement between equipment provider 70, HSP 20, and/or user 50.

Installation service provider 80 installs premise equipment 52 at a premise designated by user 50 based on an installation service order 84 received at installation service provider interface 82. Installation service provider 80 may represent any appropriate party capable of installing premise equipment 52 at the premise, performing any appropriate configuration of premise equipment 52, and initiating operation of premise equipment 52.

Figure 2:
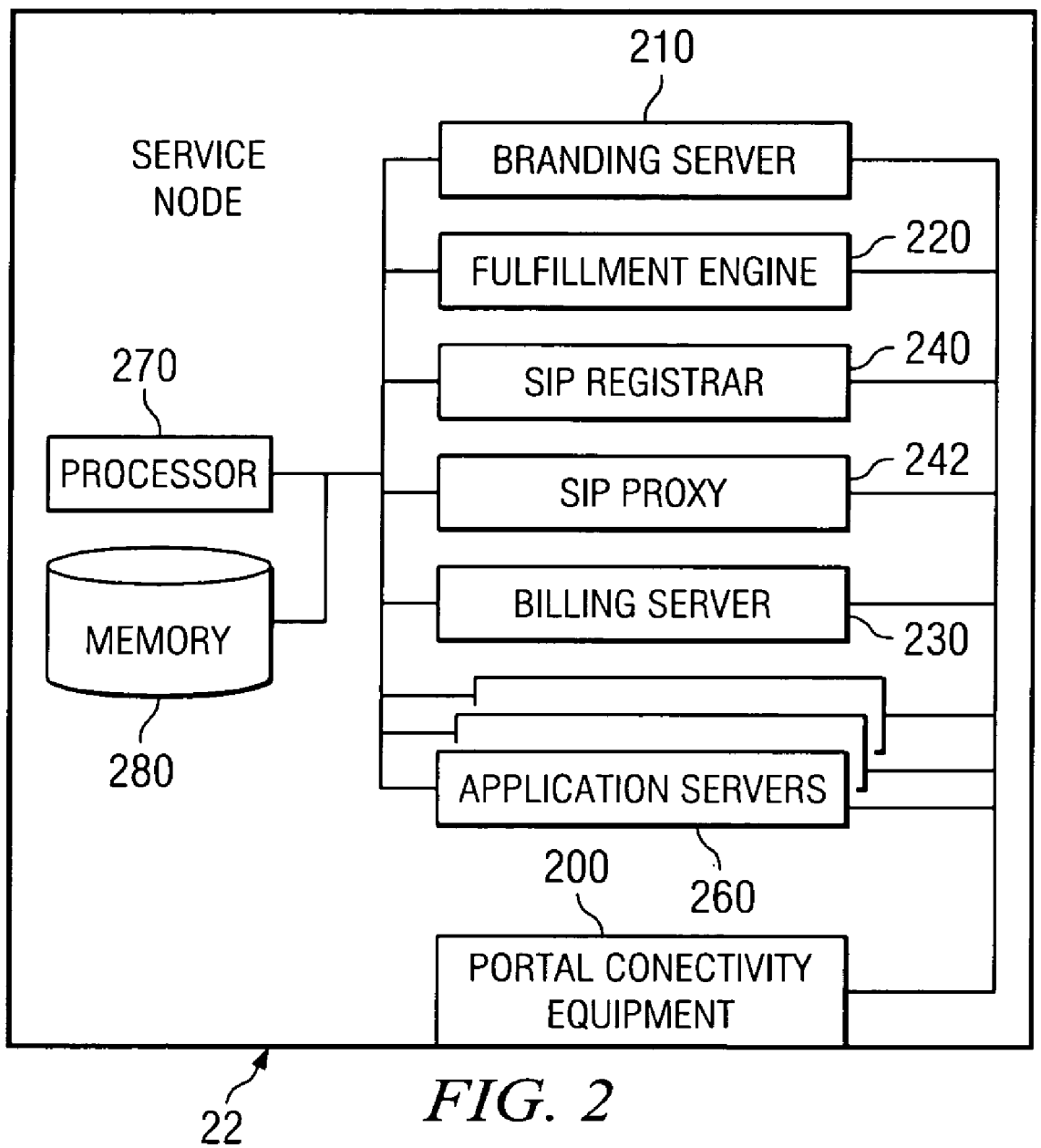
FIG. 2 illustrates the contents and operation of a service node utilized in a particular embodiment of the communication system shown in FIG. 1.

With respect to the elements of communication system 10, service node 22 may connect premise equipment 52 to PSTN access equipment 32 and/or Internet access equipment 42 to facilitate the use of communication services, provide communication or professional services to supplement those provided by service providers, provide information on services offered by HSP 20, generate bills for services and equipment utilized by user 50, and/or provide any other appropriate functionality associated with communication network 10. FIG. 2 and the associated text below illustrate the contents and operation of service node 22 in greater detail.

PSTN 24 may represent all or a portion of any suitable circuit-switched network capable of supporting telephony service to premise equipment 52. More specifically, PSTN 24 may be operable to provide circuit-switched telephony service to premise equipment 52 through service node 22, including one or more of local, long distance, and international telephone service. User 50 may couple to PSTN 24 for circuit-switched communication through service node 22 and one or more instances of PSTN access equipment 32 operated by one or more TSPs 30.

PSTN access equipment 32 provides user 50 a connection to PSTN 24 using equipment operated by or associated with a particular TSP 30. Each instance of PSTN access equipment 32 may include any appropriate software and/or hardware to facilitate the connection of premise equipment 52 to components of PSTN 24 through a connection provided by a particular TSP 30, using equipment operated by that TSP 30. In the illustrated embodiment, PSTN access equipment 32 includes a gateway 36 to packetize circuit-switched traffic destined for service node 22 and to convert packets received from service node 22 into circuit-switched traffic streams for transmission on PSTN 24. PSTN access equipment 32 may authenticate users of premise equipment 52, authorize access to services on PSTN 24, and/or monitor usage by premise equipment 52 of any communication services that utilize PSTN 24. Additionally, communication system 10 may offer communication services provided by a plurality of TSPs 30 each operating an instance of PSTN access equipment 32 through which service node 22 may selectively and dynamically connect premise equipment 52 to PSTN 24. Service node 22 may select a particular TSP 24 to service user 50 based on services provided by a particular TSP 30, rates charged by a particular TSP, or any other appropriate criteria or consideration. For example, FIG. 1 illustrates an embodiment of communication system 10 which includes PSTN access equipment 32a-c operated by a local TSP 30a, a long-distance TSP 30b, and an international TSP 30c providing, respectively, local, long-distance, and international telephone service.

Internet 26 may represent any suitable collection and arrangement of components providing packet-based communication services including, but not limited to, data and/or voice communication. Although FIG. 1 illustrates a particular embodiment of communication system 10 that includes Internet 26, communication system 10 may additionally or alternatively include any other type of public or private packet-switched network operable to support data and/or voice communication. While not explicitly shown, Internet 26 may include routers, hubs, switches, gateways, connectivity elements, and/or any other appropriate components in any suitable form or arrangement.

As illustrated, Internet 26 couples to one or more instances of Internet access equipment 42 operated by a particular ISP 40. Internet access equipment 42 may include any appropriate software and/or hardware to facilitate the connection of premise equipment 52 to Internet 26 components through a connection provided by the associated ISP 40, using equipment operated by that ISP 40. Internet access equipment 42 may authenticate users of premise equipment 52, authorize access to data and services on Internet 26, and/or monitor usage by premise equipment 52 of any communication services that utilize Internet 26.

Broadband connection 98 represents any suitable hardware and/or software appropriate for providing a broadband connection between premise equipment 52 to service node 22. In the illustrated embodiment, service node 22 supports broadband communication through a portion of the PSTN. In such an embodiment, broadband connection 98 includes one or more digital signal-0 (DS0) trunks connecting premise equipment 52 to service node 22. In alternative embodiments, service node 22 may provide satellite or cable broadband communication services to premise equipment 52, and broadband connection 98 may include suitable components to support such services.

Application servers 56 provide additional communication services and other specialized functionality to premise equipment 52. Application servers 56 may provide any additional services appropriate to supplement communication services provided by HSP 20, TSPs 30 and ISPs 40, such as teleconferencing and webhosting. Application servers 56 may also provide specialized professional services and other suitable functionality that user 50 may access through premise equipment 52. Application servers 56 may represent any appropriate combination of software and/or hardware suitable to provide the relevant services.

Premise equipment 52 represents any or all communication equipment located at a premise of user 50 through which user 50 utilizes communication services provided by service node 22. In the illustrated embodiment, premise equipment 52 includes a voice-enabled data appliance (VEDA) 100, voice over Internet protocol (VoIP) telephones 102, personal computers (PCs) 104, web servers 106, an automatic call distributor (ACD) 108, a voice appliance 110, facsimile machines 116, modem 114, and analog telephones 112.

VEDA 100 supports packet-based communication between service node 22 and appropriately configured premise equipment 52 that user 50 may be operating at the customer premise, such as VoIP telephones 102, networked PCs 104, web servers 106, and ACD 108, over broadband connection 98. VEDA 100 may include routers, switches, firewalls, traffic shaping, VPNs, etc., or any other appropriate combination of components for connecting any appropriate component of premise equipment 52 to service node 22 and/or routing traffic destined for or transmitted by premise equipment 52 to an appropriate destination.

Voice appliance 110 supports communication, through VEDA 100 and broadband connection 98, for premise equipment 52 that are configured for circuit-switched communication. Voice appliance 110 may packetize circuit-switched communication streams generated by any such premise equipment 52 and may convert packets received for such circuit-switched communication equipment into a circuit-switched communication stream. In the illustrated embodiment, voice appliance 110 facilitates communication between service node 22 and circuit-switched premise equipment 52, such as analog telephones 112 and facsimile machine 116. Additionally, voice appliance 110 may couple analog telephones 112 or other circuit-switched components of premise equipment 52 to a 911 operator through a foreign exchange (FX) connection 118 to provide user 50 of premise equipment 52 with access to E911 services apart from broadband connection 98.

Fulfillment interface 62 receives information from user 50 defining communication services and/or premise equipment 52 requested by user 50, generates a service request 64 based on this information, and communicates service request 64 to service node 22. In a particular embodiment, fulfillment interface 62 represents a computer located at a retail vendor for premise equipment 52. In such an embodiment, user 50 or an agent of the vendor may enter information defining requested communication services and/or premise equipment 52 and fulfillment interface. Fulfillment interface 62 may then communicate this information to service node 22 as an email message, as data entered into a form on a webpage hosted by service node 22, or in any other appropriate manner. In an alternative embodiment, fulfillment interface 62 may represent a telephone and user 50 may communicate service request 64 to service node 22 verbally or using the telephone keypad. In general, however, fulfillment interface 62 may represent any appropriate hardware and/or software for receiving and communicating information describing communication services and/or premise equipment 52 requested by user 50 to service node 22.

Installation service provider interface 82, equipment provider interface 72, and broadband service provider interface 92 receive from service node 22 installation service order 84, equipment order 74, and broadband service order 94 defining, respectively, installation services, premise equipment 52, and broadband connection 98 requested by or selected for user 50. Installation service provider interface 82, equipment provider interface 72, and broadband service provider interface 92 may represent any appropriate collection of hardware and/or software to allow installation service provider 80, equipment provider 70, and broadband service provider 90 to receive the appropriate information. Examples of installation service provider interface 82, equipment provider interface 72, and broadband service provider interface 92 include, but are not limited to, networked PCs, telephones, and facsimile machines.

Trust server 88 provides premise equipment 52 a trustworthy source of information on the location of particular network elements following installation. For example, one or more components of premise equipment 52 may contact trust server 88 during installation, using a trusted address hardwired in that component, to obtain a network address or other location information for service node 22 or particular components of service node 22, such as a proxy server. Trust server 88 may be operated by equipment provider 70, a manufacturer of premise equipment 52, or any other appropriate entity. Trust server 88 may represent any appropriate combination of hardware and/or software, including controlling logic, suitable for providing the functionality described below. Although FIG. 1 illustrates an embodiment of communication system 10 in which service node 22 is configured to connect premise equipment 52 to trust server 88 prior to authentication, alternative embodiments of communication system 10 may include service nodes 22 that will not form any connections for premise equipment 52 until after service node 22 has contacted trust server 88 and service node 22 has subsequently authenticated premise equipment 52, as described below with respect to FIG. 4. Thus, in such embodiments, premise equipment 52 may use another connection to trust server 88 to request and receive location information for service node 22 and/or to authenticate premise equipment 52 during installation.

In operation, user 50 transmits a service request 64 to service node 22 from fulfillment interface 62. Service request 64 may represent any appropriate form of communication based on the characteristics and configuration of fulfillment interface 62 and communication system 10. For example, in a particular embodiment, fulfillment interface 62 represents a PC and may transmit service request to service node 22 as part of an email, a hypertext transfer protocol (HTTP) message, or any other appropriate form of message. As another example, fulfillment interface 62 may represent a telephone and user 50 may communicate service request 64 to service node 22 by placing a phone call to a human or automated operator associated with service node 22.

Furthermore, service request 64 may include any suitable information describing communication services and/or premise equipment 52 requested by user 50 and any other appropriate information to be used to initiate service of user 50. Service request 64 may specify particular communication services and/or premise equipment 52, such as a particular long distance plan offered by a particular TSP 30, or may describe characteristics, criteria, preferences, or requirements of communication services requested by user 50, such as by defining types of services requested, quality of service (QoS) requirements for particular services, or desired rates. Service request 64 may also provide user identification information 66 that identifies user 50 and/or the premise at which service is to be initiated. User identification information 66 may include a name and/or other identifying information for user 50 or a party responsible for paying for communication services provided to user 50, a mailing address for the premise at which premise equipment 52 will be installed, a billing address for user 50, a bank account maintained by user 50, a current phone number for user 50, and/or any other appropriate information for identifying user 50 and performing any other tasks associated with establishing service for user 50 such as authenticating the identity of user 50, establishing the suitability of the designated premise for certain types of communication services, or acquiring the credit history of user 50. As illustrated, service request 64 includes user identification information 66, equipment criteria 67, and one or more sets of communication service criteria 68 which are generated by fulfillment interface 62 based on information provided by user 50.

Upon receiving service request 64, service node 22 generates one or more orders to initiate communication services and/or installation services or obtain premise equipment 52 for user 50. As illustrated, service node 22 generates broadband service order 94, telephone service order 34, Internet service order 44, installation service order 84, application order 58, and equipment order 74 and transmits these orders to appropriate entities, as described below. In a particular embodiment of communication system 10, however, service node 22 may generate and transmit any, none, or all of these orders and may generate and transmit any appropriate alternative requests, based on the configuration of communication system 10 and the services requested by user 50.

Service node 22 generates broadband service order 94 and transmits broadband service order 94 to broadband service provider 90 through broadband service provider interface 92. Broadband service order 94 includes broadband service criteria 96, any or all of user identification information 66, and any other suitable information. Broadband service criteria 96 includes any appropriate information for identifying characteristics, requirements, or preferences for requested broadband connection 98 to connect user 50 to service node 22. In a particular embodiment, broadband service criteria 96 specifies a number of DS0 channels for broadband service provider 90 to provision for user 50 based on requested services or on QoS, bandwidth, or other criteria provided in service request 64. In response to receiving broadband service order 94, broadband service provider 90 may establish an account for user 50, provision a requested number of DS0 channels for broadband connection 98, or complete any other appropriate task to allow premise equipment 52 to connect to service node 22 through broadband connection 98 following installation of premise equipment 52 at the designated premise in accordance with broadband service criteria 96. Broadband service provider 90 may also ship user 50 additional premise equipment 52 associated with broadband service such as a broadband modem or router.

Service node 22 also generates equipment order 74 and transmits equipment order 74 to equipment provider 70 through equipment provider interface 72. As noted above, equipment provider interface 72 may represent or comprise any components capable of receiving electronic information from service node 22 including, but not limited to, telephones, facsimile machines, and PCs. Equipment order 74 includes equipment criteria 67, any or all of user identification information 66, and any other suitable information. Equipment criteria 67 may represent any appropriate information that may be used by equipment provider to determine appropriate premise equipment 52 to provide user 50 and may identify specific equipment or specify characteristics, requirements, or preferences for premise equipment 52 requested by user 50. In a particular embodiment, equipment criteria 67 identifies a quantity of particular models of VoIP telephones 102, PCs 104, and/or VEDAs 100 carried by equipment provider 70. In response to receiving equipment order 74, equipment provider 70 may establish an account for user 50, order requested premise equipment 52, retrieve the requested premise equipment from inventory, ship the requested premise equipment 52 to user 50 or installation service provider 80, and/or complete any other appropriate task to provide user 50 with premise equipment 52.

Service node 22 additionally generates one or more Internet service orders 44, telephone service orders 34, and/or application orders 58 and transmits these orders to Internet access equipment 42, PSTN access equipment 32, application servers 56 and/or other appropriate equipment operated by one or more ISPs 40, TSPs 30, or ASPs 60. Internet access equipment 42 and PSTN access equipment 32 may include telephones, networked PCs, or other appropriate interfaces suitable to receive, respectively, internet service orders 44 and telephone service orders 34. Additionally, application server 56 or other components operated by ASPs 60 may be configured to accept application orders 58. Telephone service orders 34, Internet service orders 44, and application orders 58 may include communication service criteria 68 for the receiving ISP 40, TSP 30, or ASP 60, any or all of user identification information 66, and any other appropriate suitable information.

Communication service criteria 68 may represent any appropriate information that may be used by the receiving TSP 30, ISP 40, or ASP 60 to determine communication services requested by user 50 and may identify specific communication services, such as particular calling plans, Internet plans, or services offered by the receiving TSP 30, ISP 40, or ASP 60 or may specify characteristics, requirements, or preferences for services requested by user 50 from that TSP 30, ISP 40, or ASP 60, such as a communication service type (e.g. long distance telephone, basic Internet connectivity), QoS requirements, rates, and/or usage limits for requested communication services. Additionally, if user 50 requests more than one type of service offered by a particular TSP 30, ISP 40, or ASP 60, a telephone service order 34, Internet service order 44, or application order 58 transmitted to that TSP 30, ISP 40, or ASP 60 may include multiple instances of communication service criteria 68 with each instance providing information for a particular communication service or type of communication service requested by user 50.

As an example, in a particular embodiment, service node 22 generates one or more telephone service orders 34 containing, collectively, an instance of communication service criteria 68 for each of local, long distance, and international telephone service, and an Internet service order 44 that includes communication service criteria for Internet service. In response to receiving telephone service order 34, TSP 30 establishes an account for user 50 and/or completes any other appropriate task to initiate communication service for user 50 over PSTN 24. Similarly, in response to receiving Internet service order 44, ISP 40 establishes an account for user 50 and/or completes any other appropriate task to initiate communication service for user 50 over Internet 26. Moreover, in response to receiving application order 58, ASP 60 establishes an account for user 50 and/or completes any other appropriate task to provide additional service for user 50 on application servers 56.

Service node 22 also generates installation service order 84 and transmits installation service order 84 to installation service provider 80 through installation service provider interface 82. As noted above, installation service provider interface 82 may represent or comprise any components capable of receiving electronically information from service node 22 including, but not limited, telephones, facsimile machines, and PCs. Installation service order 84 includes installation service criteria 76, any or all of user identification information 66, and any other suitable information. Installation service criteria 76 may represent any appropriate information that may be used by installation service provider 80 to provide suitable installation services. In a particular embodiment, installation service criteria 76 identifies one or more premise equipment 52, one or more communication service requested by user 50, and a date by which all appropriate entities will have completed account setup and any other appropriate preliminary tasks. In response to receiving installation service order 84, equipment provider 70 establishes an account for user 50, contacts user 50 and/or HSP 20 to schedule installation, contacts equipment provider 70 to arrange delivery premise equipment 52, and/or completes any other appropriate task to facilitate the provision of installation services.

Figure 4:
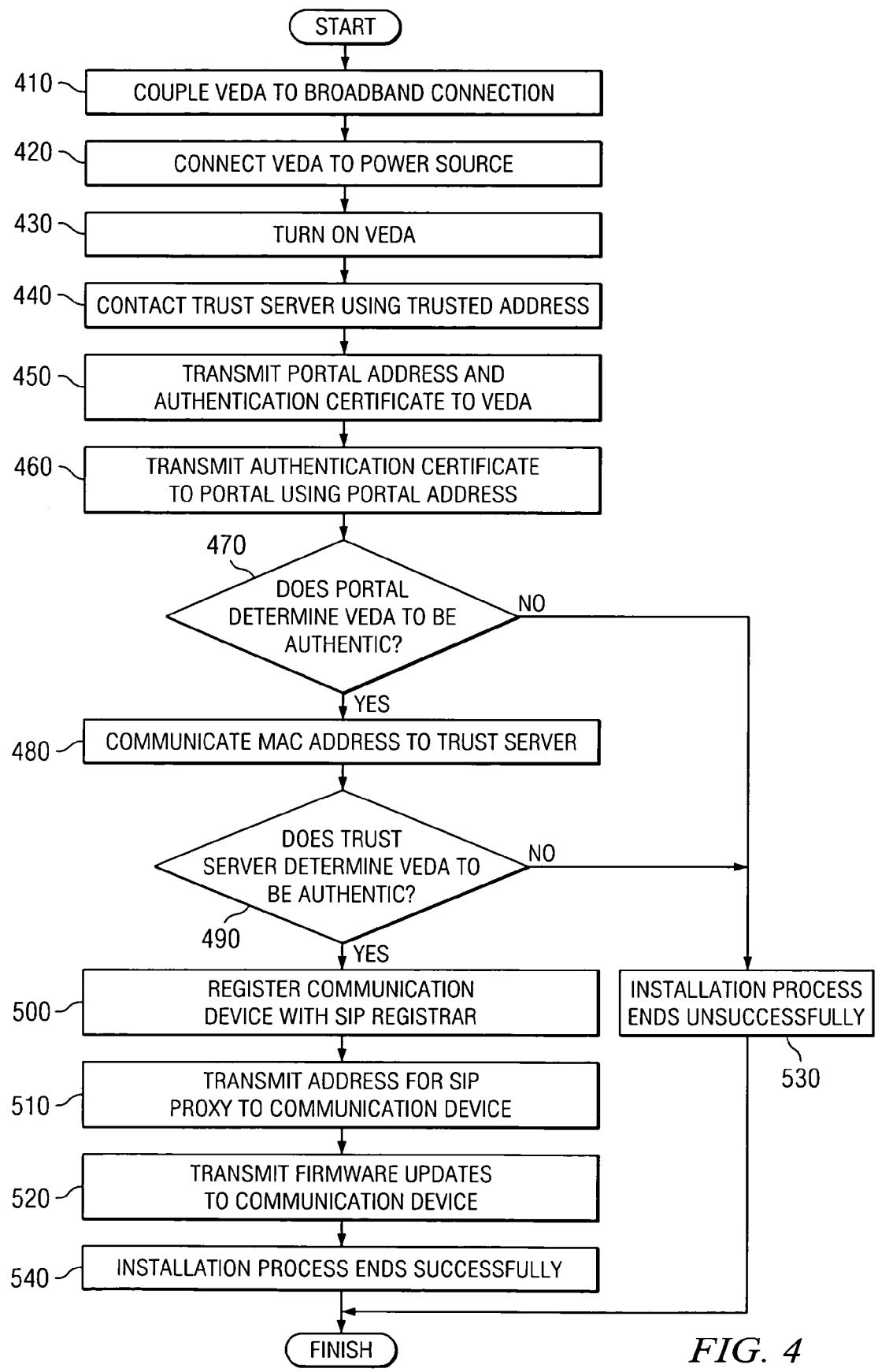
FIG. 4 is a flowchart illustrating further operation of a particular embodiment of the communication system during installation of customer premise equipment.

After all appropriate accounts have been established for user 50, premise equipment 52 has been delivered to user 50 or installation service provider 80, and/or any other appropriate preliminary tasks have been performed by the relevant entities, installation service provider 80 performs installation services at the designated premise based, at least in part, on information included in installation service order 84. The performed installation services may include connecting individual components of premise equipment 52 to one another, coupling appropriate premise equipment 52 to broadband connection 98, registering with service node 22 or other components of communication system 10, activating accounts with ISPs 40, TSPs 30, ASPs 60, or HSP 20, initializing premise equipment 52, and/or any other appropriate tasks related to configuring premise equipment 52 and other components of communication system 10 to initiate communication service for user 50. FIG. 4 illustrates in greater detail an example installation process that may be used to install certain types of premise equipment 52 in particular embodiments of communication system 10. Once premise equipment 52 has been installed, user 50 may begin utilizing communication services provided by ISPs 40, TSPs 30, ASPs 60, and HSP 20. While active, service node 22 may couple user 50 to predetermined service providers to utilize various communication services or may, whenever user 50 requests communication services, select from a plurality of available service providers based on rates, QoS, or any other appropriate criteria.

As a result of the described process for requesting and initiating communication service, particular embodiments of communication system 10 may provide a streamlined and simple process by which user 50 can obtain communication services. Additionally, by initiating multiple services and ordering premise equipment 52 based on service request 64, communication system 10 may by able to reduce the amount of time user 50 must commit to initiating the desired services, reduce errors from repeated and redundant entry of information by the various entities, and limit the amount of knowledge required on the part of user 50 to effectively initiate desired communication services. Furthermore, by consolidating the service initiation process and reducing or eliminating any need for user 50 to independently interact with the multiple entities, particular embodiments may ensure that premise equipment 52 and various communication services provided to user 50 are all compatible and/or optimally matched.

Additionally, in particular embodiments of communication system 10, service node 22 may also support billing functionality for communication services and other services utilized by user 50. In such an embodiment, service node 22 may receive billing information 150 from one or more elements of communication system 10 or one or more entities. Although FIG. 1 illustrates, for purpose of example, an embodiment of communication system 10 in which service node 22 receives billing information from each of TSPs 30, ISPs 40, ASPs 60, installation service provider 80, equipment provider 70, and broadband service provider 90, in a particular embodiment of communication system 10 in which service node 22 supports billing functions, service node 22 may receive billing information from any one or more entities controlling elements of communication system 10.

Billing information 150 includes information to be used in calculating an amount user 50 is to be charged for services or equipment provided by the relevant entity. Billing information 150 may be generated by the appropriate entities and transmitted to service node 22 at appropriate intervals or as a one-time occurrence. Additionally, billing information 150 may include information specific to user 50, such as minutes of long-distance service utilized by user 50, and/or information pertaining to multiple or all customers of the relevant entity, such as rate information associated with particular types of service provided by that entity. For example, service node 22 may receive, once or periodically, rate tables for various types of phone calls from one or more TSPs 30. Service node 22 may store these rate tables in memory 280 of FIG. 2. Service node 22 may also periodically receive from the same TSP 30 or TSPs 30 usage information for user 50, such as minutes of long-distance service used by user 50, and may calculate an amount owed by user 50 based on both the rate tables and the usage information. In general, however, billing information may include any appropriate information to be used in calculating an amount user 50 is to be charged for any one or more services provided by communication service or equipment utilized by user 50.

For example, in a particular embodiment, equipment provider 70 transmits billing information 150*a* to service node 22 that specifies periodic leasing charges for premise equipment 52. Installation service provider 80 transmits billing information 150*b* for initial installation services, maintenance, and/or support services provided by installation service provider 80. Broadband service provider 90 transmits billing information 150*c* and one or more ISPs 40 transmit billing information 150*d* that specifies a flat-rate periodic fee for broadband and Internet connectivity, respectively. Additionally, in this example, each TSP 30 transmits billing information 150*e* that includes one or more rate tables specifying pricing information for particular types of calls supported by that TSP and periodically transmits billing information 150*f* that specifies an aggregate amount of time which user 50 utilized telephone services provided by that TSP 30 to make calls of each of the various types defined by the rate tables. Also, if appropriate, one or more ASPs 60 may transmit billing information 150*g* that specifies fees for services provided by those ASP 60.

After receiving billing information 150 from appropriate entities or at any other appropriate time, service node 22 or HSP 20 may charge user 50 a total amount owed by user 50 for premise equipment 52, installation services, communication services, or other appropriate services or equipment provided to user 50. This total amount may also include charges for use of services provided by service node 22 itself. For the purposes of this description, service node 22 may "charge" user 50 the total amount by generating a bill or invoice indicating the total amount owed, deducting the total amount from an account maintained by user 50 (for example, from a debit-card account associated with user 50), charging the total amount to a credit account maintained by user 50 (for example, to a credit card account associated with user 50), or completing any other appropriate action, step, or process to indicate to user 50 or other appropriate parties the total amount owed by user 50 and/or to collect the total amount from user 50 or other appropriate parties. For example, in particular embodiments, service node 22 may generate a consolidated bill 28 that indicates the total amount. After generating consolidated bill 28, service node 22, in particular embodiments, may additionally transmit consolidated bill 28 to user 50, for example, as part of an email message.

In a particular embodiment, service node 22 may receive billing information from all entities associated with communication system 10 for all services and equipment provided to user 50 in connection with the operation of communication system 10. Thus, user 50 may receive a single bill for all charges. As a result, service node 22 may further simplify use of communication system 10 for user 50. Furthermore, these billing features may allow HSP 20 to act as a sole point of contact for all billing issues for user 50, simplifying operations for the various entities providing equipment and services to user 50.

FIG. 2 illustrates, in greater detail, contents and operation of service node 22 according to a particular embodiment. Service node 22 may be operable to initiate communication service for user 50 by requesting account setup from ISPs 40, TSPs 30, and ASPs 60, premise equipment 52 from equipment provider 70, and installation services from installation service provider 80, bill user 50 for communication services provided by ISPs 40, TSPs 30, and ASPs 60, and provide additional professional services that user 50 may access through premise equipment 52. As illustrated, service node 22 includes a branding server 210, a fulfillment engine 220, a billing server 230, portal connectivity equipment 200, one or more portal application servers 260, a processor 270, and a memory 280. Additionally, FIG. 2 illustrates an embodiment of service node 22 that supports session initiation protocol (SIP) control signaling. As a result, service node 22, as illustrated, also includes SIP registrar 240 and SIP proxy 242.

Each of branding server 210, fulfillment engine 220, SIP registrar 240, SIP proxy 242, billing server 230, portal connectivity equipment 200, and portal application servers 260 may include any suitable combination of software and/or hardware, including appropriate control logic, for providing the functionality described below. Although FIG. 2 illustrates each of branding server 210, fulfillment engine 220, SIP registrar 240, SIP proxy 242, billing server 230, portal connectivity equipment 200, and portal application server 260 as a separate element of service node 22, any one or more of these elements may, where appropriate, incorporate a portion or all of any other one or more of these elements. As illustrated, branding server 210, fulfillment engine 220, SIP registrar 240, SIP proxy 242, billing server 230, portal connectivity equipment 200, and portal application server 260 represent software processes running on one or more processors, shown collectively as processor 270. Furthermore, in a particular embodiment, service node 22 encloses all of branding server 210, fulfillment engine 220, SIP registrar 240, SIP proxy 242, billing server 230, portal connectivity equipment 200, and portal application server 260 in a single housing 190, as shown in FIG. 2. Service node 22 may, however, represent any suitable number of physically discrete components located in a single location or dispersed, as appropriate, throughout communication system 10.

Branding server 210 provides information describing communication services and/or premise equipment 52 offered or supported by service node 22. In a particular embodiment, branding server 210 represents a software process running on a web server at service node 22 and hosts a website that provides potential users 50 with information on services and equipment that service node 22 or communication system 10 can provide. Branding server 210 may generate and/or transmit any appropriate information pertaining to communication services and/or premise equipment supported by service node 22 including, but not limited to, features of supported communication services, service rates, equipment costs, terms of service for supported communication services, and or contact information for HSP 20.

Fulfillment engine 220 receives service request 64 from user 50 and facilitates setup and initiation of communication services to user 50 by transmitting additional orders to appropriate entities of communication system 10 based on information included in service request 64, as described above with respect to FIG. 1. Fulfillment engine 220 may receive service request 64 from fulfillment interface 62 in any appropriate manner. For example, in a particular embodiment, fulfillment interface 62 may represent a telephone through which user 50 or another party provides information defining communication services and/or premise equipment 52 requested by user 50. In such an embodiment, fulfillment interface 62 may include or couple to an automatic call distributor (ACD) that receives service request 64 as verbal information or as dual-tone multi-frequency (DTMF) signals and transmits such information in an appropriate form to appropriate components of fulfillment engine 220. In an alternative embodiment, fulfillment interface 62 represents a PC and fulfillment engine 220 represents a software application running on a web server accessible by this PC. In such an embodiment, user 50 may be able to enter information specifying requested communication services and/or premise equipment 52 using a keyboard or other components of the PC. Fulfillment interface 62 may then generate service request 64 based on this information and transmit service request 64 as part of an email or an HTTP message to fulfillment interface 220. Similarly, fulfillment engine may transmit the various orders to appropriate interfaces in any suitable manner, based on the configuration of the relevant interfaces.

Billing server 230 receives billing information 150 from Internet access equipment 42, PSTN connection equipment 32, and/or the associated ISP 40, TSPs 30, or ASPs 60 and generates consolidated bill 28 based, at least in part, on billing information 150 received from these entities. Billing server 230 may also receive billing information 150 from installation service provider 80 and equipment provider 70 and generate consolidated bill 28 based, at least in part, on billing information 150 received from these entities, as well. As described in greater detail below, billing information 150 may identify any suitable information to be used in calculating an amount user 50 is to be charged including service usage information for user 50, service rate information, usage quotas for user 50, equipment rental rates, and/or any other appropriate information pertaining to charges, fees, or other amounts to be charged user 50. Billing server 230 may then generate a consolidated bill 28 based on all billing information 150 received by billing server 230. In a particular embodiment, billing server 230 may also transmit the consolidated bill 28 to user 50, for example, as part of an email message.

Portal connectivity equipment 200 provides an interface allowing service node 22 to communicate with premise equipment 52, Internet access equipment 42, PSTN access equipment 32, fulfillment interface 62, and/or other components of communication system 10. Additionally, portal connectivity equipment 200 couples premise equipment 52 to PSTN 24 and/or Internet 26 and routes traffic to and from premise equipment 52 through broadband connection 98. Portal connectivity equipment 200 may include any suitable combination of hubs, routers, switches, bridges, and/or any other appropriate connectivity or routing components. Portal connectivity equipment 200 may also include appropriate components for authenticating users of service node 22, authorize access to Internet access equipment 42 and/or PSTN access equipment 32, and/or monitor usage of other services provided by service node 22. As used in this description, "portal connectivity equipment 200" may refer generically to both components through which service node 22 connects premise equipment 52 to PSTN 24 or Intern 26 and/or components through which portal connects to premise equipment 52 or other elements of communication system 10 for other purposes (such as for transmitting consolidated bill 28 or receiving service request 64).

Portal application servers 260 provide additional communication services and other specialized functionality to premise equipment 52. Portal application servers 260 may provide any additional services appropriate to supplement communication services provided by ISPs 40, TSPs 30, and ASPs 60, such as teleconferencing and webhosting. Portal application servers 260 may also provide specialized professional services and other suitable functionality that user 50 may access through premise equipment 52.

As one example, portal application server 260 may include appropriate software and/or hardware for medical transcription allowing user 50 to contact portal application server 260 using VoIP telephone 102 and dictate information to be transcribed and delivered to user 50. As another example, portal application server 260 may include appropriate software and/or hardware to accept and/or execute requests for legal research. As yet another example, portal application server 260 may include appropriate software and/or hardware to perform appointment scheduling allowing clients or patients of user 50 to contact service node 22 by phone or PC and schedule an appointment with user 50. In general, however, portal application server 260 may include suitable components to provide any appropriate communication services to supplement those provided by ISPs 40, TSPs 30, and ASPs 60 and to provide any other suitable services or functionality that user 50 may access through premise equipment 52.

SIP registrar 240 registers the address, identity and/or location of SIP-enabled premise equipment 52 during installation of premise equipment 52 and provides this location to components of communication system 10 when suitable to facilitate communication between premise equipment 52 and other components of communication system 10. SIP proxy 242 receives SIP messages from premise equipment 52 and forwards these messages, as appropriate, to SIP proxies or other suitable servers in PSTN access equipment 32 and Internet access equipment 42 to initiate communication sessions between premise equipment and equipment coupled to PSTN 24 or Internet 26. SIP proxy 242 may provide functions such as authentication, authorization, network access control, address translation, routing, request retransmission, and security. As noted above, FIG. 2 illustrates, for purposes of illustration, a particular embodiment of service node 22 that supports SIP control signaling. Alternative embodiments of service node 22 may substitute other components for SIP registrar 240 and SIP proxy 242 to support appropriate signaling functionality based on the requirements of any such protocols supported by service node 22.

Processor 270 may be a general purpose computer, dedicated microprocessor, or other processing device capable of processing electronic information. Examples of processor 270 include application-specific integrated circuits (ASICs), field-programmable gate arrays (FPGAs), digital signal processors (DSPs) and any other suitable specific or general purpose processors. Although FIG. 2 illustrates a particular embodiment of service node 22 that includes a single processor 270, service node 22 may include any suitable number of processors 270. This description uses the term "processor 270" to refer to any such processing device or processing devices within service node 22, coupled to service node 22, or otherwise accessible by service node 22. Thus, any two references to "processor 270" in this description may or may not refer to the same physical device depending on the configuration and contents of a particular embodiment of service node 22. As a result, FIG. 2 illustrates an embodiment of service node 22 in which all such processing elements are shown collectively as processor 270. Furthermore, processors 270 may be located in a single location or within a single component, or may be distributed among multiple locations or components within communication system 10.

Memory 280 may comprise any collection and arrangement of volatile or non-volatile, local or remote devices suitable for storing data, such as for example random access memory (RAM) devices, read only memory (ROM) devices, magnetic storage devices, optical storage devices, or any other suitable data storage devices. The description below uses the term "memory 280" to refer to any such memory device or memory devices within service node 22, coupled to service node 22, or otherwise accessible by service node 22. Thus, any two references to "memory 280" in this description may or may not refer to the same physical device depending on the configuration and contents of a particular embodiment of service node 22. As a result, FIG. 2 illustrates an embodiment of service node 22 in which all such memory devices are shown collectively as memory 280. Furthermore, memory 280 may be located in a single location or within a single component, or may be distributed among multiple locations or components within communication system 10

In operation, service node 22 may be responsible for initiating service for user 50 with ISPs 40, TSPs 30, and ASPs 60, billing user 50 for any services provided by these service providers, and providing additional communication, professional, or other services. With respect to initiating communication services, service node 22 may receive service request 64 from fulfillment interface 62 and generate one or more orders to service providers and/or equipment provider 70 to fulfill service request 64. In particular, fulfillment engine 220 receives service request 64 which specifies services and/or equipment requested by user 50 and/or describes criteria, requirements, or preferences for services or equipment requested by user 50. Based on service request 64, fulfillment engine 220 generates one or more service orders and, if appropriate, equipment order 74 and transmits these orders to appropriate entities, as described above with respect to FIG. 1.

In response to the orders, one or more of TSPs 30, ISPs 40, and/or ASPs 60 establish an account for user 50 based on telephone service orders 34, Internet service orders 44, and application orders 58 or complete any other appropriate steps to initiate or reject the requested communication services for user 50. Additionally, equipment provider 70 may deliver, or make available for pickup, appropriate premise equipment 52 to user 50.

Once any appropriate setup has been completed by TSPs 30, ISPs 40, ASPs 60 and broadband service provider 90 and once user 50 has, if appropriate, obtained premise equipment 52 from equipment provider 70, installation service provider 80 may perform installation services at the premise at which premise equipment 52 is to be installed. The preliminary setup of service with TSPs 30, ISPs 40, and ASPs 60 initiated by service node 22, as described above, may allow installation service provider 80 to perform setup at the premise using a streamlined installation process that is simple and time-efficient. FIG. 4 and the associated text describe an example installation process in greater detail.

After premise equipment 52 has been installed and is operational, service node 22 may also provide functionality to support communication services provided by ISPs 40, TSPs 30, and ASPs 60. For example, in the illustrated embodiment, service node 22 supports SIP control signaling and includes SIP registrar 240 and SIP proxy 242. During installation, premise equipment 52 may register with SIP registrar 240 and obtain an address for SIP proxy 242 of service node 22, as described below with respect to FIG. 4. Once premise equipment 52 has obtained an address for SIP proxy 242, premise equipment may initiate, support, and terminate communication sessions with other devices over PSTN 24 or Internet 26 using SIP messages transmitted to SIP proxy 242 and forwarded by SIP proxy 242 to appropriate components of communication system 10.

As noted above, once premise equipment 52 is installed, service node 22 may also provide additional services to user 50 using portal application server 260. Thus, user 50 may access portal application server 260 to utilize web hosting, teleconferencing, or other communication services, and/or transcription, research, scheduling or other miscellaneous services. Portal application server 260 may also monitor usage of such services and transmit billing information 150 associated use of these services by user 50 to billing server 230.

Figure 5:
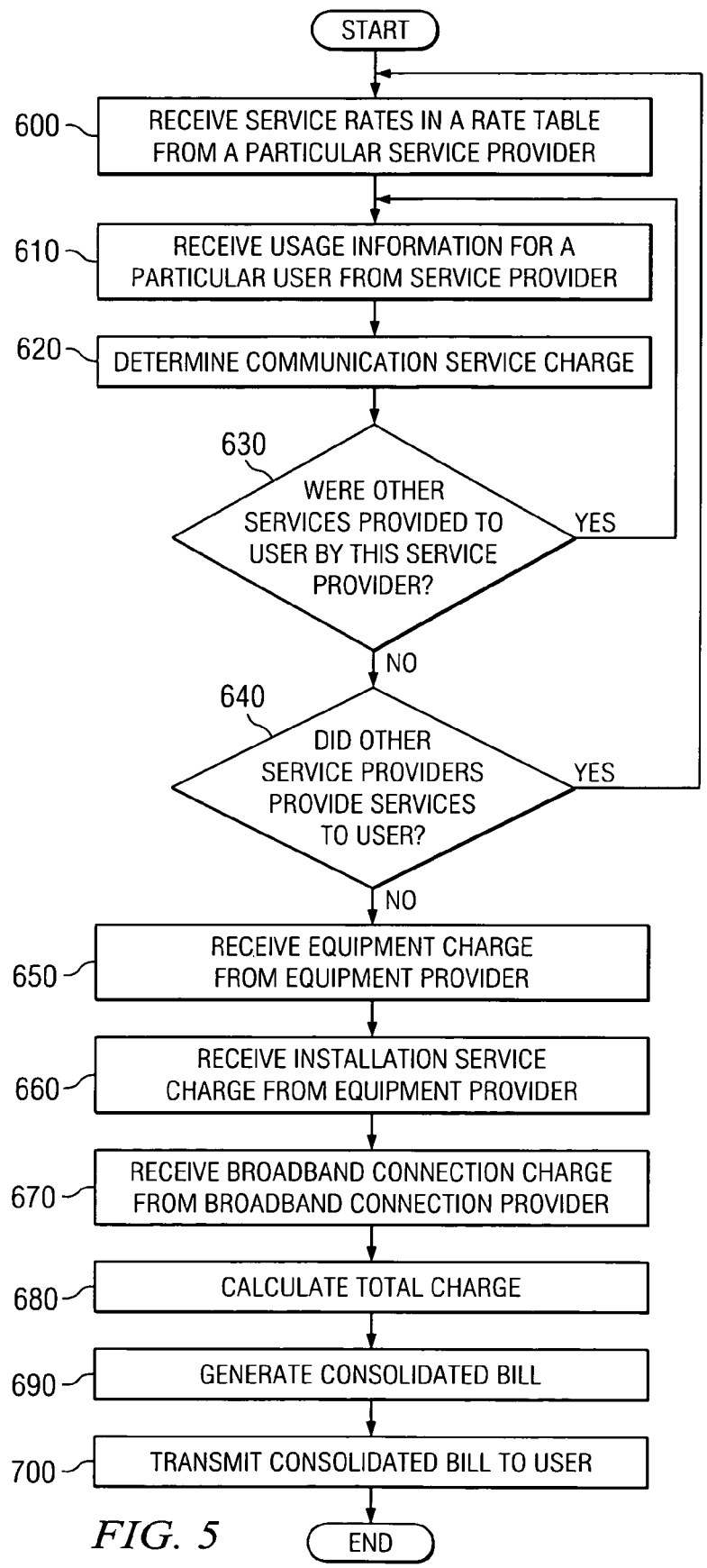
FIG. 5 is a flowchart illustrating operation of a particular embodiment of the communication system in billing a user for communication services provided by the communication system.

Furthermore, once premise equipment 52 is installed and operational, service node 22 may be capable of generating consolidated bill 28 for communication services, installation services, other additional services, and premise equipment 52 utilized by user 50. In particular, billing server 230 may receive, at appropriate times, billing information 150 from ISPs 40, TSPs 30, ASPs 60, broadband service provider 90, installation service provider 80, and equipment provider 70 specifying amounts to be charged user 50. Billing server 230 may receive billing information 150 from appropriate entities as a one-time occurrence or as a periodic event. After receiving billing information 150, or at any other appropriate time, billing server 230 generates consolidated bill 28 which includes all, or an appropriate subset of, charges to be billed to user 50. In particular embodiments, billing server 230 may then transmit consolidated bill 28 to user 50, for example, as part of an email message. An example operation of billing server 230 in generating consolidated bill 28 is illustrated in FIG. 5 and the associated text below.

Thus, particular embodiments of service node 22 may provide user 50 a streamlined and simplified process for initiating, using, and paying for communication services and other services provided by communication system 10. Additionally, because the components of service node 22 may, in particular embodiments, be enclosed in a single housing 190, service node 22 may be sold as a single component that may be purchased and operated by a HSP 20 with limited expertise. This may furthermore result in very flexible, optimized relationships between the various entities with HSP 20 focusing on marketing and initiating communication services and billing user 50 for communication services, while the various service providers may then allowed to focus on optimizing services provided, maintaining and upgrading infrastructure, and other technical concerns.

Figure 3:
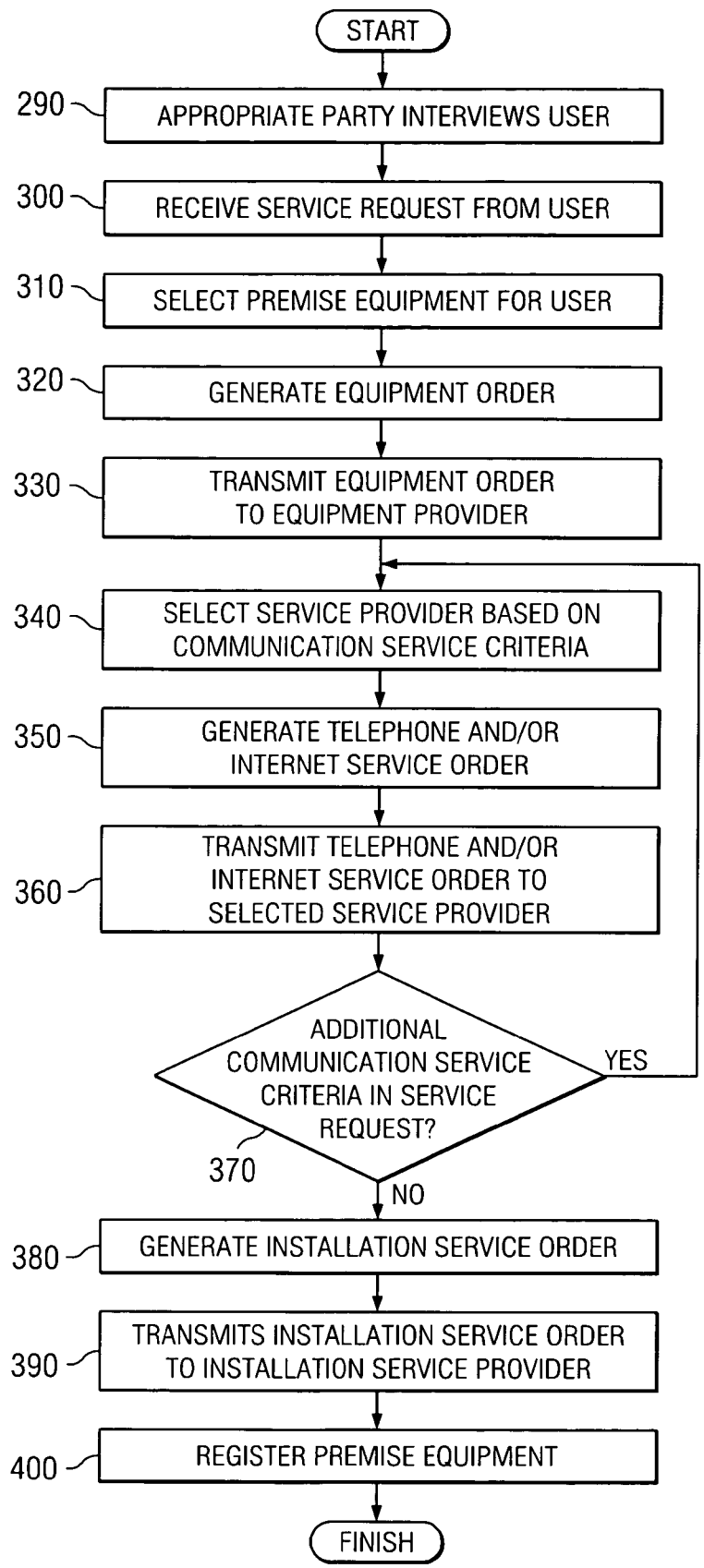
FIG. 3 is a flowchart illustrating operation of a particular embodiment of the communication system in initiating communication services for a user.

FIG. 3 is a flowchart illustrating operation of a particular embodiment of the communication system in initiating communication services for user 50. The process begins with HSP 20, an ISP 40, a TSP 30, an ASP 60, an equipment provider 70, an installation service provider 80, a broadband service provider 90, or any other suitable party interviews user 50 to determine communication services and premise equipment 52 requested by the user, and other criteria for communication services to be provided to user 50. Alternatively, user 50 can provide this information independently by completing a form on a webpage, by answering questions presented by an automated telephone system, or in any other appropriate manner. At step 300, service node 22 receives service request 64 from user 50 through fulfillment interface 62. Although service request 64 may include user identification information 66, equipment criteria 67, one or more communication service criteria 68, broadband service criteria 96, and/or any other appropriate information, in this example service request 64 is assumed to include user identification information 66, equipment criteria 67, and a plurality of communication service criteria 68.

At step 310, service node 22 selects premise equipment 52 for user 50 based on equipment criteria 67 in service request 64. In alternative embodiments, equipment criteria 67 may be omitted from service request 64, and service node 22 may instead select premise equipment 52 based on communication service criteria 68 and/or other appropriate information. At step 320, service node 22 generates equipment order 74. Equipment order 74 includes user identification information 66 and specifies the premise equipment 52 selected by service node 22. Service node 22 transmits equipment order to equipment provider 70 at step 330.

Service node 22 then selects a first service provider based on first communication service criteria 68. In the illustrated example, first communication service criteria 68 is assumed to specify criteria for requested local telephone service. Thus, at step 340, service node 22 selects a particular TSP 30 based on first communication service criteria 68. Service node 22 generates first telephone service order 34 that includes user identification information 66 and that may specify communication services request of the first TSP 30 by user 50 at step 350. In this example, first telephone service order 34 specifies that user 50 is requesting local telephone service from the first TSP 30. At step 360, service node 22 transmits first telephone service order 34 to the selected first TSP 30.

Service node 22 then determines whether service request 64 includes any additional communication service criteria 68 at step 370. If so, service node 22 may return to step 340 to repeat steps 340-360 for additional communication service criteria 68. For example, service node 22 may select a second service provider to for requested long-distance telephone service, generate a second telephone service order that specifies communication services request of the second service provider and transmit the second telephone service order 34 to the selected service provider.

At step 380, service node 22 generates an installation service order 84 that specifies installation services to be performed at the designated premise at which user 50 will be using premise equipment 52. Service node 22 transmits installation service order 84 to installation service provider 80 at step 390. Once user 50 has received premise equipment 52, installation service provider 80 may install premise equipment 52 at the designated premise and attempt to register premise equipment 52 with service node 22. At step 400, service node 22 registers premise equipment 52 and may begin servicing premise equipment 52. Although FIG. 3 illustrates an example of the operation of communication system 10 in initiating service for user 50, particular embodiments of communication system 10 may include any, all, or none of the described steps.

FIG. 4 is a flowchart illustrating in greater detail a process for installing premise equipment 52. In particular, FIG. 4 illustrates installation of premise equipment for use with a particular embodiment of communication system 10 that supports SIP. Although the illustrated method focuses, for the sake of simplicity, on the installation of VEDA 100, this method may be used on any appropriate form of premise equipment 52.

In the described embodiment of communication system 10, VEDA 100 is hardcoded with an IP or other suitable form of address for trust server 88 that is assumed to be unchanging. This address is referred to as a "trusted address." Additionally, VEDA 100 stores a MAC address or other form of identifier uniquely identifying VEDA 100. Furthermore, although the following description assumes that installation is performed by installation service provider 80, as noted above, user 50 or any other appropriate entity may alternatively perform the installation of premise equipment 52.

At step 410, installation service provider 80 couples VEDA 100 to broadband connection 98. Installation service provider 80 connects VEDA 100 to a power source at step 420. At step 430, installation service provider 80 turns on VEDA 100.

As part of or following bootup, VEDA 100 contacts trust server 88, at step 440, using the trusted address stored in VEDA 100. 440→470-490→450-460. Trust server 88 transmits to VEDA 100 information specifying the address or other identifying properties of an appropriate service node 22 for VEDA 100 at step 450. Trust server 88 may also transmit to VEDA 100 information to allow the relevant service node 22 to authenticate VEDA 100, such as an authentication certificate that includes a digital signature associated with trust server 88. VEDA then transmits the authentication certificate, the MAC address, and/or other authenticating information to service node 22 at step 460. At step 470, service node 22 determines whether VEDA 100 is authentic based on the authentication certificate, the MAC address, and/or other authenticating information transmitted by VEDA 100 and information stored by service node 22. In a particular embodiment, authentication is performed by SIP registrar 240. If service node 22 is not able to successfully authenticate VEDA 100, service node 22 may take any appropriate security measures and the installation process ends unsuccessfully at step 530.

At step 480, VEDA 100 communicates a unique identifier associated with the customer and VEDA 100, such as a serial number or contract number, with this particular VEDA 100 and stored in VEDA 100 to trust server 88. Trust server 88 determines whether VEDA 100 is authentic based on the MAC address transmitted by VEDA 100 and information stored by trust server 88 at step 490. In a particular embodiment, trust server 88 is operated by a particular manufacturer of premise equipment 52 and trust server 88 stores MAC addresses for all premise equipment 52 made by that manufacturer. If VEDA 100 is not authentic, trust server may take any appropriate security measures and the installation process ends unsuccessfully at step 530.

If service node 22 and trust server 88 successfully authenticate VEDA 100, SIP registrar 240 or other appropriate components of service node 22 register the address, identify and/or location of VEDA 100 and/or other premise equipment 52 coupled to VEDA 100 at step 500. SIP registrar 240 or other appropriate components of service node 22 transmit an address for SIP proxy 242 to VEDA 100 and/or other premise equipment 52 coupled to VEDA 100 at step 510. Additionally, appropriate components of service node 22 may, at step 520, transmit firmware updates or other suitable configuration information to VEDA 100 and/or other premise equipment 52 coupled to VEDA 100. This configuration information may include a dial plan, such as one or more phone numbers HSP 20 assigns to that VEDA 100. The installation process ends successfully at step 530 and user 50 may utilize communication services supported by service node 22.

FIG. 5 illustrates operation of a particular embodiment of service node 22 in generating consolidated bill 28. More specifically, in the described embodiment of communication system 10, billing server 230 receives a variety of different types of billing information 150 from a plurality of elements of communication system 10 for amounts to be charged to user 50. Billing server 230 determines a total charge for user 50 based on all billing information 150 received by billing server 230. Although billing server 230, in this example, receives several particular types of billing information 230, in a particular embodiment of communication system 10, billing server 230 may receive none, some, or all of the described billing information 150 and/or any other suitable forms of billing information 150.

At step 600, in the embodiment of communication system 10 described by FIG. 5, billing server 230 receives service rates from TSP 30 or ISP 40 in billing information 150. Service rates may specify a per usage charge associated with a particular type of service provided by that service provider. The service rates may specify the per usage charge in any appropriate manner using any suitable units. In the described embodiment, service rates represent a per minute charge for a particular type of communication service offered by the relevant service provider.

Additionally, the service rate may be transmitted to billing server 230 as billing information 150 in any suitable format and/or structured in any appropriate manner. In the described embodiment, billing server 230 receives a rate table from a service provider that includes rate information for a plurality of different types of communication services offered by the relevant service provider. As one example, the rate table may include rates for each of local telephone service, long-distance telephone service, and international telephone service. As another example, the rate table may include separate service rates for telephone service, including any or all of local, long-distance, and, international telephone service, and Internet connectivity service. In general, billing server 230 may receive service rates associated with any appropriate type or classification for communication services offered by the relevant service provider.

At step 610, billing server 230 receives usage information from the same service provider. The usage information specifies an amount of a particular type of service that was used by a particular user 50. The usage information may specify this amount in any appropriate manner using any suitable units. For example, the usage information may specify an amount of time the user 50 utilized a particular service. In a particular embodiment, usage information represents a total number of minutes user 50 used a particular communication service provided by the service provider.

At step 620, billing server 230 determines a first communication service charge for the user based on the first service rate and the first usage amount. In a particular embodiment, billing server 230 determines the first communication service charge by multiplying the value of the usage information for a particular communication service by the service rate for that particular communication service as provided by the relevant service provider. At step 630, billing server 230 may determine whether user 50 has used other services and, if so, may return to step 600 repeat steps 600-620 and determine additional communication service charges for other types of communication service provided by the same service provider. Once billing server 230 has completed calculating all communication service charges accrued by user 50 for communication services provided by the first service provider, billing server 230 may, at step 640 determine whether other communication service providers have provided communication services to user 50 and, if so, may return to step 600 to repeat steps 600-640 to calculate communication service charges for additional communication service providers.

At step 650, billing server 230 receives an equipment charge from equipment provider 70. In a particular embodiment, the equipment charge represents an amount to be charged user 50 for premise equipment 52 provided to user 50. At step 660, billing server 252 receives an installation service charge for user 50 from installation service provider 80. The installation service charge may represent an amount to be charged user 50 for installation services associated with premise equipment 52 possessed or utilized by user 50. At step 670, billing server 230 receives a broadband connection charge for user 50 from broadband connection provider 90. The broadband connection charge may represent an amount to be charged user 50 for a broadband connection 98 that couples premise equipment 52 utilized operated by user 50 to one or more service providers 30 or 40. At step 680, billing server 230 receives application charges from one or more ASP 60 that specify periodic or per-transaction charges for services provided by ASPs 60.

At step 690, billing server 230 calculates a total charge to be billed to user 50. Billing server 230 may calculate this total charge based on one or more communication service charges, the equipment charge, the installation service charge, the broadband connection charge, the application charges, and the equipment charge, as appropriate based on the service and equipment requested and/or used by user 50. After calculating the total charge, billing server 230 charges user 50 the total amount. In particular embodiments, billing server 230 may charge user 50 by generating consolidated bill 28 which includes the total charge, at step 700. At step 710, billing server 230 may also transmit consolidated bill 28 to user 50 or may initiate and/or facilitate the delivery of consolidated bill 28 to user 50. As one example, billing server 230 may transmit consolidated bill 28 to user 50 as part of an email message. As another example, billing server 230 may initiate the delivery of consolidated bill 28 by printing a consolidated bill 28 and/or a mailing label for consolidated bill 28. In alternative embodiments, billing server 230 may, instead of or in addition to generating consolidated bill 28, charge the total charge to a credit card or debit card account associated with user 50.

Although FIG. 5 illustrates operation of a particular embodiment of billing server 230 that executes a particular series of steps in a particular order, alternative embodiments of billing server 230 may perform any, all, or none of these step and may also perform any suitable additional steps based on the configuration of billing server 230 and communication system 10. Furthermore, billing server 230 may perform any such steps in any suitable order and may repeat steps as appropriate.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method of providing communication service, comprising:
   receiving, at a processor, user identification information and first communication service criteria, wherein the user identification information identifies a user, and wherein the first communication service criteria describe a first type of packet-based communication service requested by the user;
   automatically selecting, with the processor, a first service provider from a plurality of service providers that provide communication services of the first type based on the received first communication service criteria;
   generating, with the processor, a first communication service order based on the first communication service criteria, wherein the first communication service order includes the user identification information and the first communication service criteria;
   selecting, with the processor, premise equipment for the user based on the first communication service criteria, the premise equipment configured to support packet-based communication at a premise associated with the user;
   generating, with the processor, an equipment order, wherein the equipment order includes the user identification information and identifies the selected premise equipment;
   transmitting the first communication service order to the selected first service provider; and
   transmitting the equipment order to an equipment provider.

2. The method of claim 1, further comprising receiving equipment criteria that describe equipment requested by the user; and wherein selecting the premise equipment comprises selecting the premise equipment for the user based on the equipment criteria.

3. The method of claim 1, further comprising:
   receiving second communication service criteria that describe a circuit-switched communication service requested by the user;
   generating a second communication service order based on the second communication service criteria, wherein the second communication service order includes the user identification information and the second communication service criteria; and
   transmitting the second communication service order to a second service provider.

4. The method of claim 1, wherein the first communication service criteria identify a first type of packet-based communication service, and further comprising:
   receiving second communication service criteria that describe a second type of packet-based communication service;
   selecting a second service provider from a plurality of service providers that provide communication services of the second type;
   generating a second communication service order based on the second communication service criteria, wherein the second communication service order includes the user identification information and the second communication service criteria; and
   transmitting the second communication service order to the second service provider.

5. The method of claim 1, further comprising delivering the premise equipment to the user.

6. The method of claim 1, further comprising:
   generating an installation service order that includes the user identification information and identifying premise equipment to be installed;
   transmitting the installation service order to an installation service provider.

7. The method of claim 6, further comprising delivering the premise equipment to the installation service provider.

8. The method of claim 1, wherein the first communication service criteria comprise one of a requested maximum usage, a quality of service (QoS) requirement, and a periodic service rate.

9. The method of claim 1, wherein the first communication service comprises one of telephone and internet services.

10. The method of claim 1, wherein the first communication service comprises one of local telephone service, long-distance telephone service, and international telephone service.

11. The method of claim 1, wherein receiving the user identification information, the equipment criteria, and the communication service criteria comprises:
    prompting a user to enter the user identification information and the first communication service criteria using a fulfillment interface coupled to a web server; and
    receiving the user identification information and the first communication service criteria at the web server.

12. The method of claim 1, wherein receiving the user identification information, the equipment criteria, and the communication service criteria comprises:
    prompting a user audibly to provide the user identification information and the first communication service criteria using a telephone keypad; and
    receiving the user identification information, the equipment criteria, and the communication service criteria as part of a telephonic communication session.

13. A system for providing communication service, comprising:
    a fulfillment interface configured to receive information from a user and to generate a service request that includes user identification information and first communication service criteria, wherein the user identification information identifies the user and wherein the first communication service criteria describe a first type of packet-based communication service requested by the user;
    first communication access equipment operated by a communication service provider and configured to support communication for premise equipment over a first network and to establish service for a user in response to a service order received by the communication service provider;
    an equipment provider interface configured to receive an equipment order and to facilitate the provision of premise equipment identified by the equipment order to the user; and
    a portal configured to:
       receive the service request from the fulfillment interface;
       generate a first communication service order based on the first communication service criteria, wherein the first communication service order includes the user identification information and the communication service criteria;
automatically select a first service provider from a plurality of service providers that provide communication services of the first type based on the received first communication service criteria;
select premise equipment for the user based on the first communication service criteria, the premise equipment configured to support packet-based communication at a premise associated with the user;
generate an equipment order, wherein the equipment order includes the user identification information and identifies the selected premise equipment;
transmit the first communication service order to the selected first service provider; and
transmit the equipment order to the equipment provider through the equipment provider interface.

14. The system of claim 13, wherein the fulfillment interface is configured to generate a service request that further comprises equipment criteria that describe premise equipment requested by the user; and wherein the portal is configured to select the premise equipment by selecting the premise equipment for the user based on the equipment criteria.

15. The system of claim 13, further comprising second communication access equipment operated by a second communication service provider and configured to support circuit-switched communication for premise equipment over a second network and to establish service for a user in response to a service order received by the second communication service provider; and wherein the fulfillment interface is configured to generate a service request that further comprises second communication service criteria that describe a circuit-switched communication service requested by the user; and wherein the portal is further configured to:
generate a second communication service order based on the second communication service criteria, wherein the second communication service order includes the user identification information and the second communication service criteria; and
transmit the second communication service order to a second service provider.

16. The system of claim 13, wherein the first communication service criteria identify a first type of packet-based communication service, and further comprising second communication access equipment operated by a second communication service provider and configured to support packet-based communication for premise equipment over a second network and to establish service for the user in response to a service order received by the second communication service provider; and wherein the fulfillment interface is configured to generate a service request that further comprises second communication service criteria that describe a second type of packet-based communication service requested by the user; and wherein the portal is further configured to:
transmit the first communication service order to the first service provider by selecting the first service provider from a plurality of service providers that provide communication services of the first type and transmitting the first communication service order to the first service provider;
select a second service provider from a plurality of service providers that provide communication services of the second type;
generate a second communication service order based on the second communication service criteria, wherein the second communication service order includes the user identification information and the second communication service criteria; and
transmit the second communication service order to the second service provider.

17. The system of claim 13, wherein the equipment provider interface is further configured to facilitate the provisioning of the premise equipment to the user by facilitating delivery of the premise equipment to the user.

18. The system of claim 13, wherein the portal is further configured to:
generating an installation service order that includes the user identification information and identifying premise equipment to be installed;
transmitting the installation service order to an installation service provider.

19. The system of claim 18, wherein the equipment provider interface is further configured to facilitate the provisioning of the premise equipment to the user by facilitating delivery of the premise equipment to the installation service provider.

20. The system of claim 13, wherein the first communication service criteria comprise one of a requested maximum usage, a quality of service (QoS) requirement, and a periodic service rate.

21. The system of claim 13, wherein the first communication service provider provides one or more of telephone and internet services.

22. The system of claim 13, wherein the first communication service provider provides one or more of local telephone service, long-distance telephone service, and international telephone service.

23. The system of claim 13, wherein the fulfillment interface is configured to receive information from the user by:
prompting a user to enter the user identification information and the first communication service criteria using a fulfillment interface coupled to a web server; and
receiving the user identification information and the first communication service criteria at the web server.

24. The system of claim 13, wherein the fulfillment interface is configured to receive information from the user by:
prompting a user audibly to provide the user identification information and the first communication service criteria using a telephone keypad; and
receiving the user identification information, the equipment criteria, and the communication service criteria as part of a telephonic communication session.

25. Logic for providing communication service, the logic encoded in non-transitory computer-readable media and configured, when executed by a processor, to:
receive user identification information and first communication service criteria, wherein the user identification information identifies a user and wherein the first communication service criteria describe a first type of packet-based communication service requested by the user;
automatically select a first service provider from a plurality of service providers that provide communication services of the first type based on the received first communication service criteria;
generate a first communication service order based on the first communication service criteria, wherein the first communication service order includes the user identification information and the communication service criteria;
select premise equipment for the user based on the first communication service criteria, the premise equipment configured to support packet-based communication at a premise associated with the user;

generate an equipment order, wherein the equipment order includes the user identification information and identifies the selected premise equipment;

transmit the first communication service order to the selected first service provider; and transmit the equipment order to an equipment provider.

26. The logic of claim 25, wherein the logic is configured to receive equipment criteria that describe equipment requested by the user; and wherein the logic is configured to select the premise equipment by selecting premise equipment for the user based on the equipment criteria.

27. The logic of claim 25, wherein the logic is further configured to:

receive second communication service criteria that describe a second communication service requested by the user;

generate a second communication service order based on the second communication service criteria, wherein the second communication service order includes the user identification information and the second communication service criteria; and transmit the second communication service order to a second service provider.

28. The logic of claim 25, wherein the first communication service criteria identify a first type of packet-based communication service, and wherein the logic is further configured to:

transmit the first communication service order by selecting the first service provider from a plurality of service providers that provide communication services of the first type and transmitting the first communication service order to the first service provider;

receive second communication service criteria that describe a second type of packet-based communication service;

select a second service provider from a plurality of service providers that provide communication services of the second type;

generate a second communication service order based on the second communication service criteria, wherein the second communication service order includes the user identification information and the second communication service criteria; and transmit the second communication service order to the second service provider.

29. The logic of claim 25, wherein the logic is configured to generate an order for the delivery of the premise equipment to the user.

30. The logic of claim 25, wherein the logic is further configured to:

generate an installation service order that includes the user identification information and identifying premise equipment to be installed; and transmit the installation service order to an installation service provider.

31. The logic of claim 30, wherein the logic is further configured to generate an order for the delivery of the premise equipment to the installation service provider.

32. The logic of claim 25, wherein the first communication service criteria comprise one of a requested maximum usage, a quality of service (QoS) requirement, and a periodic service rate.

33. The logic of claim 25, wherein the first communication service comprises one of telephone and internet access services.

34. The logic of claim 25, wherein the first communication service comprises one of local telephone service, long-distance telephone service, and international telephone service.

35. The logic of claim 25 wherein the logic is configured to receive the user identification information and the communication service criteria by:

prompting a user to enter the user identification information and the first communication service criteria using a fulfillment interface coupled to a web server; and receiving the user identification information and the first communication service criteria at the web server.

36. The logic of claim 25 wherein the logic is configured to receive the user identification information and the communication service criteria by:

prompting a user audibly to provide the user identification information and the first communication service criteria using a telephone keypad; and receiving the user identification information, the equipment criteria, and the communication service criteria as part of a telephonic communication session.

37. A system for providing communication service, comprising:

means for receiving user identification information and first communication service criteria, wherein the user identification information identifies a user and wherein the first communication service criteria describe a first type of packet-based communication service requested by the user;

means for automatically selecting a first service provider from a plurality of service providers that provide communication services of the first type based on the received first communication service criteria;

means for generating a first communication service order based on the first communication service criteria, wherein the first communication service order includes the user identification information and the first communication service criteria;

means for selecting premise equipment for the user based on the first communication service criteria, the premise equipment configured to support packet-based communication at a premise associated with the user;

means for generating an equipment order, wherein the equipment order includes the user identification information and identifies the selected premise equipment;

means for transmitting the first communication service order to the first service provider; and means for transmitting the equipment order to an equipment provider.

* * * * *